US012463338B2

(12) United States Patent
Wang

(10) Patent No.: US 12,463,338 B2
(45) Date of Patent: Nov. 4, 2025

(54) ANTENNA DEVICE AND BEAM CONTROL METHOD

(71) Applicant: DELTA ELECTRONICS, INC., Taoyuan (TW)

(72) Inventor: Tsai-Hsiang Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 562 days.

(21) Appl. No.: 17/934,207

(22) Filed: Sep. 22, 2022

(65) Prior Publication Data

US 2023/0369758 A1 Nov. 16, 2023

(30) Foreign Application Priority Data

May 13, 2022 (CN) .......................... 202210524257.1

(51) Int. Cl.
*H01Q 3/24* (2006.01)
*H01Q 21/10* (2006.01)
*H04B 7/06* (2006.01)

(52) U.S. Cl.
CPC ............... *H01Q 3/24* (2013.01); *H01Q 21/10* (2013.01); *H04B 7/0639* (2013.01)

(58) Field of Classification Search
CPC ........ H01Q 3/24; H01Q 21/10; H04B 7/0639; H04B 7/0604; H04B 7/06956; H04B 7/0408; H04B 7/0617
See application file for complete search history.

(56) References Cited

U.S. PATENT DOCUMENTS 6,157,681 A    12/2000   Daniel et al.
10,103,823 B1 * 10/2018   Kyrolainen ........ H04B 17/3912
(Continued)

FOREIGN PATENT DOCUMENTS

CN    112134604 A    12/2020
CN    112136352 A    12/2020
(Continued)

OTHER PUBLICATIONS

ZTE, "Performance analysis of cell search in NR", 3GPP Draft; R1-166420 Performance Analysis of Cell Search in NR, 3rd Generation Partnership Project (3GPP), retrieved on Aug. 13, 2016.

*Primary Examiner* — Dhaval V Patel
(74) *Attorney, Agent, or Firm* — CKC & Partners Co., LLC

(57) ABSTRACT

An antenna device is provided, which includes an antenna array, a beamforming circuit and a processor. The beamforming circuit is connected to the antenna array, where the beamforming circuit is used for controlling the antenna array to perform beamforming, where the beamforming circuit includes a temporary storage circuit, where the temporary storage circuit includes a first-in-first-out region, and the first-in-first-out region stores multiple beam indices. The processor is connected to the beamforming circuit, where the processor is used for controlling the beamforming circuit through a first processing interface to sequentially read the multiple beam indexes by a first-in-first-out method, and set a direction of a beam of the antenna array according to the read beam index, where the read beam index corresponds to the direction of the beam of the antenna array. In addition, a beam control method is also disclosed herein.

20 Claims, 8 Drawing Sheets

(56) References Cited

U.S. PATENT DOCUMENTS

| | | | | |
|---|---|---|---|---|
| 11,265,063 | B2* | 3/2022 | Tang | .................... H04B 7/0408 |
| 2019/0372633 | A1 | 12/2019 | Chang et al. | |
| 2021/0083752 | A1* | 3/2021 | Lee | ....................... H04B 7/088 |
| 2021/0359739 | A1 | 11/2021 | Mattheijssen et al. | |
| 2022/0060239 | A1* | 2/2022 | Liu | ..................... H04B 7/0617 |

FOREIGN PATENT DOCUMENTS

| | | |
|---|---|---|
| CN | 113259033 A | 8/2021 |
| CN | 113364505 A | 9/2021 |
| TW | 201902162 A | 1/2019 |
| TW | 202015361 A | 4/2020 |

* cited by examiner

ANTENNA DEVICE AND BEAM CONTROL METHOD

CROSS-REFERENCE TO RELATED APPLICATION

This application claims priority to China Application Serial Number 202210524257.1, filed May 13, 2022, which is herein incorporated by reference in its entirety.

BACKGROUND

Field of Disclosure

The present disclosure relates to technology of a fifth generation new radio (5G NR). More particularly, the present disclosure relates to an antenna device and beam control method.

Description of Related Art

In a fifth-generation new radio (5G NR) millimeter wave (mmWave) antenna array, beamforming methods are often used in the antenna array to transmit various signals. However, whenever the antenna array needs to change a direction of its beam, a processor often needs to transmit a large amount of data related to the beam to a beamforming integrated circuit (IC) to set the direction of the beam of the antenna array. Further, in prior art, it is often necessary to first store, through the serial peripheral interface (SPI), a beam table in the beamforming integrated circuit, and set, through the serial peripheral interface, the general-purpose input/output interface (GPIO) to control the beam switching corresponding to the beam table. By this, it is necessary to transmit a complete beam index to the beamforming integrated circuit through the serial peripheral interface, and control the beamforming integrated circuit to switch the beam through the general-purpose input/output interface. Therefore, it often takes a lot of time to complete the step of setting the direction of the beam of the antenna array. In view of this, how to greatly reduce the time required for setting the beam direction of the antenna array is a problem that those skilled in the art are eager to solve.

SUMMARY

The disclosure provides an antenna device, which comprises an antenna array, a beamforming circuit and a processor. The beamforming circuit is connected to the antenna array, wherein the beamforming circuit is configured for controlling the antenna array to perform beamforming, wherein the beamforming circuit comprises a temporary storage circuit, wherein the temporary storage circuit comprises a first-in-first-out region, and the first-in-first-out region stores a plurality of beam indices. The processor is connected to the beamforming circuit, wherein the processor is configured for controlling the beamforming circuit through a first processing interface to sequentially read the plurality of beam indices by a first-in-first-out method, and a beam direction of the antenna array is set according to a read beam index, wherein the read beam index corresponds to the beam direction of the antenna array.

The disclosure provides a beam control method, which comprises: controlling, by a beamforming circuit, an antenna array to perform beamforming, wherein the beamforming circuit comprises a temporary storage circuit, wherein the temporary storage circuit comprises a first-in-first-out region, and the first-in-first-out region stores a plurality of beam indices; controlling, through a first processing interface, the beamforming circuit to sequentially read the plurality of beam indices by a first-in-first-out method; and setting the beam direction of the antenna array according to a read beam index in beam sweep time, wherein the beam sweep time, which is less than or equal to a cycle prefix time, is set in the cycle prefix time.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
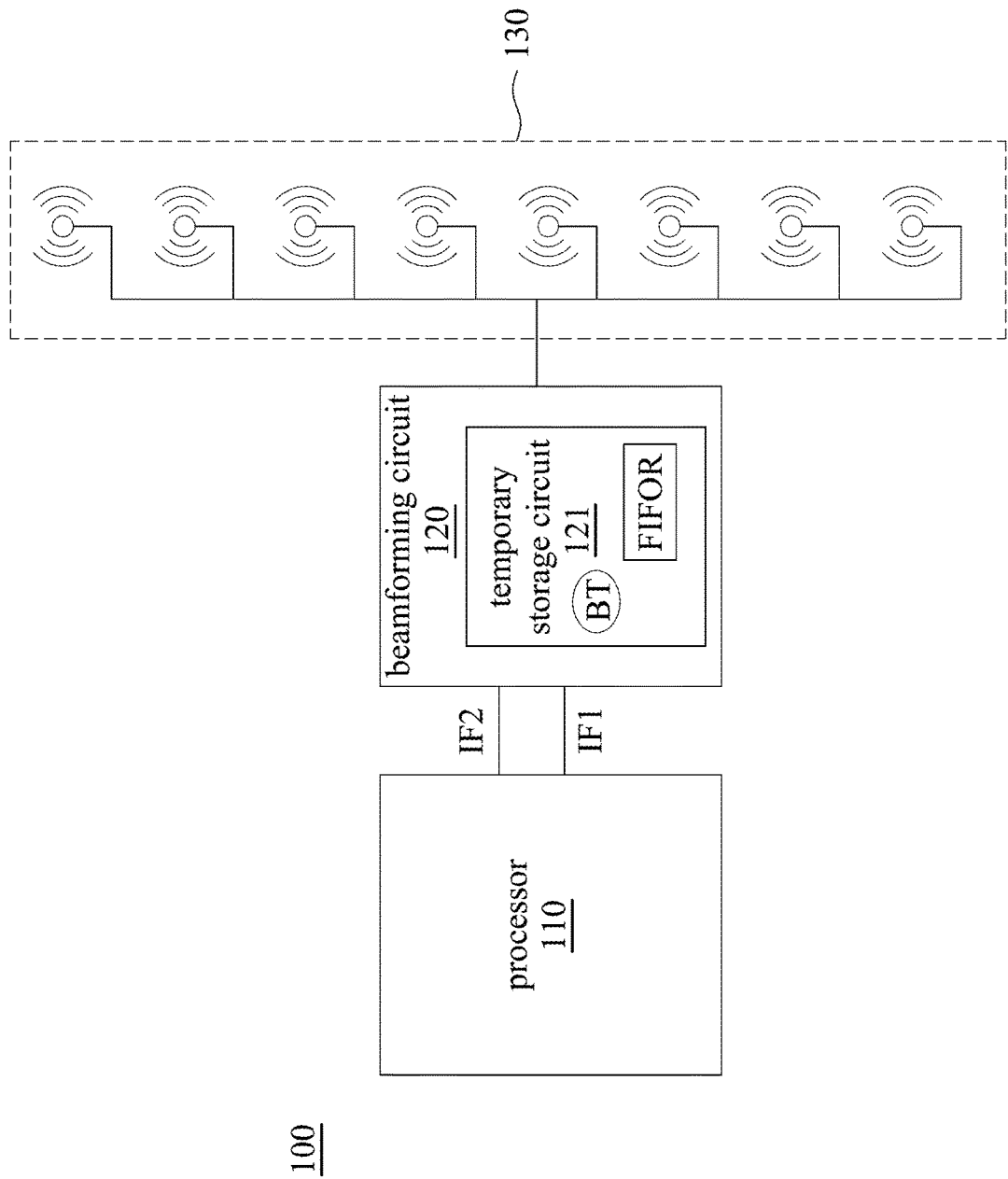
FIG. 1 is a schematic diagram of an antenna device of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram of an antenna device 100 of the present disclosure. In this embodiment, the antenna device 100 includes a processor 110, a beamforming circuit 120 and an antenna array 130. The processor 110 is connected to the beamforming circuit 120, and the beamforming circuit 120 is connected to the antenna array 130.

In some embodiments, the processor 110 can be implemented by a processing circuit, a central processing unit, or a computing unit. In some embodiments, the beamforming circuit 120 can be implemented by a commonly used analog beamforming integrated circuit (IC). In some embodiments, the antenna array 130 can include multiple antenna elements, where the antenna elements can be any type of antenna (e.g., a patch antenna or an inverted-F antenna, etc.).

In some embodiments, the processor 110 can control, through the first processing interface IF1 and the second processing interface IF2, the beamforming circuit 120. In some embodiments, the first processing interface IF1 can be a general-purpose Input/output (GPIO) interface, and the second processing interface IF2 can be a serial peripheral interface (SPI).

In this embodiment, the beamforming circuit 120 is used for controlling the antenna array 130 to perform beamforming. In addition, the beamforming circuit includes a temporary storage circuit 121.

In some embodiments, the temporary storage circuit 121 can be a temporary register. In some embodiments, in an initial stage (i.e., system initialization), the processor 110 can store, through the second processing interface IF2, a beam table BT in the temporary storage circuit 121. In some embodiments, the beam table BT can include beam parameters of multiple candidate beam directions and multiple candidate beam indices corresponding to the candidate beam directions.

In some embodiments, the beam parameter of the candidate beam direction can be a phase control bit string and an amplitude control bit string (e.g., all consisting of three strings of bits) of each antenna element corresponding to the candidate beam direction steered by one or more beams determined in advance by simulation, where the phase control bit string of each antenna element can be used for controlling a phase of each antenna element to adjust the beam direction of the antenna array 130, the amplitude control bit string of each antenna element can be used for controlling an amplitude of each antenna element to adjust a beam width of the antenna array 130.

In this embodiment, the temporary storage circuit 121 includes a first-in-first-out region FIFOR, and the first-in-first-out region FIFOR stores multiple beam indices. In other words, in the initial stage, the beam indices are stored in the first-in-first-out region FIFOR sequentially in advance.

Furthermore, the processor 110 is used for controlling, through the first processing interface IF1, the beamforming circuit 120 to sequentially read the multiple beam indices, and setting the beam direction of the antenna array 130 according to a read beam index, where the read beam index corresponds to the beam direction of the antenna array 130.

In some embodiments, the processor 110 can control, through the first processing interface IF1, the beamforming circuit 120 to select the beam parameter of a corresponding candidate beam direction from the beam table BT according to the read beam index. In other words, the candidate beam index with the same beam parameter is searched from the beam table BT, and the beam parameter of the candidate beam direction corresponding to the candidate beam index is selected. Next, the processor 110 can set the beam direction of the antenna array 130 according to the beam parameter of the corresponding candidate beam direction. The following is an explanation with an actual example of the first-in-first-out region FIFOR shown in Table 1 and the beam table BT shown in Table 2.

TABLE 1

| Beam | Beam index |
|---|---|
| A | 0 |
| B | 1 |
| C | 2 |
| D | 3 |

TABLE 2

| Beam | Beam index | Beam parameter | Candidate beam direction |
|---|---|---|---|
| A | 0 | A first phase control bit group and a first amplitude control bit group | −16 degrees |
| B | 1 | A second phase control bit group and a second amplitude control bit group | −5 degrees |
| C | 2 | A third phase control bit group and a third amplitude control bit group | 5 degrees |
| D | 3 | A fourth phase control bit group and a fourth amplitude control bit group | 16 degrees |

It can be known from Table 1 that the processor 110 controls, through the first processing interface IF1, the beamforming circuit 120 to sequentially read the beam indices 0 to 3 by the first-in-first-out method. Next, it can be known from Table 2 that the processor 110 selects the beam parameter of the corresponding candidate beam direction from the beam table BT according to the read beam index, where the beam parameter of the corresponding candidate beam direction can include a group of phase control bit strings and a group of amplitude control bit strings (e.g., the first phase control bit group and the first amplitude control bit group). In this way, the beamforming circuit 120 can set the direction of the beam (A to D) of the antenna array 130 according to the beam parameter of the corresponding beam (A to D). For example, when the beam index read by the beamforming circuit 120 is 0, the beamforming circuit 120 can adjust the phase of each antenna element in the antenna array 130 according to the first phase control bit group to perform phase control, and can adjust the amplitude of each antenna element in the antenna array 130 according to the first amplitude control bit group to perform gain control, so as to set the direction of the beam A of the antenna array 130 to −16 degrees. In other words, the processor 110 sequentially switches, through the first processing interface IF1, from beam A to beam D according to beam indices 0 to 3.

Notably, when the first processing interface IF1 is a general-purpose input/output interface, as long as the processor 110 transmits a sweep signal with a small amount of data (e.g., 3 general-purpose input/output clock signals) to the beamforming circuit 120, the beamforming circuit 120 will sequentially read the multiple beam indices the first-in-first-out method in the first-in-first-out region FIFOR, and set the direction of the beam (A to D) of the antenna array 130 according to the read beam index. In this way, the time required for switching the direction of the beam (A to D) of the antenna array 130 will be greatly reduced.

Figure 2A:
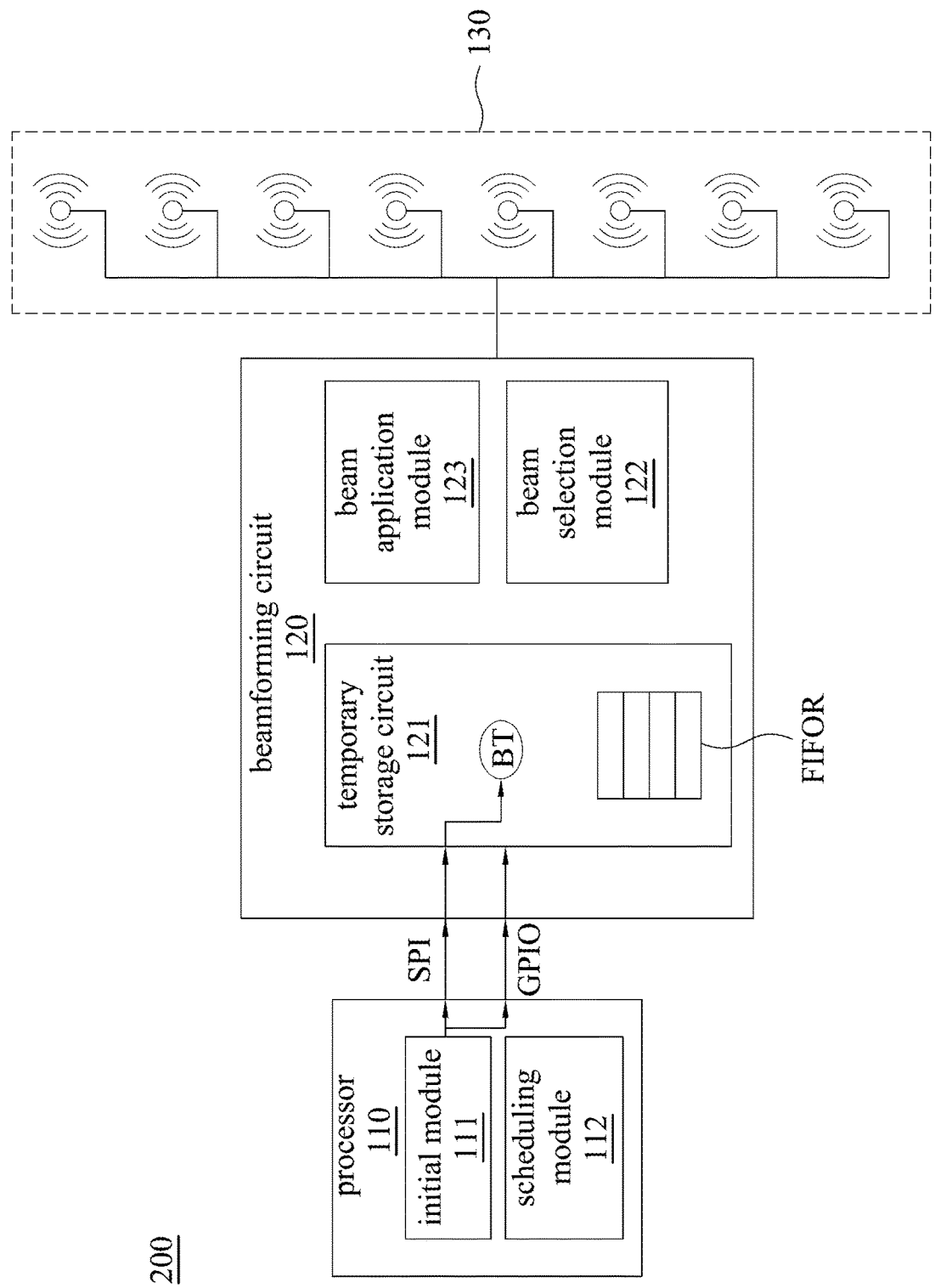
FIG. 2A is a schematic diagram of the antenna device in an initial stage according to some embodiments of the present disclosure.
Figure 2B:
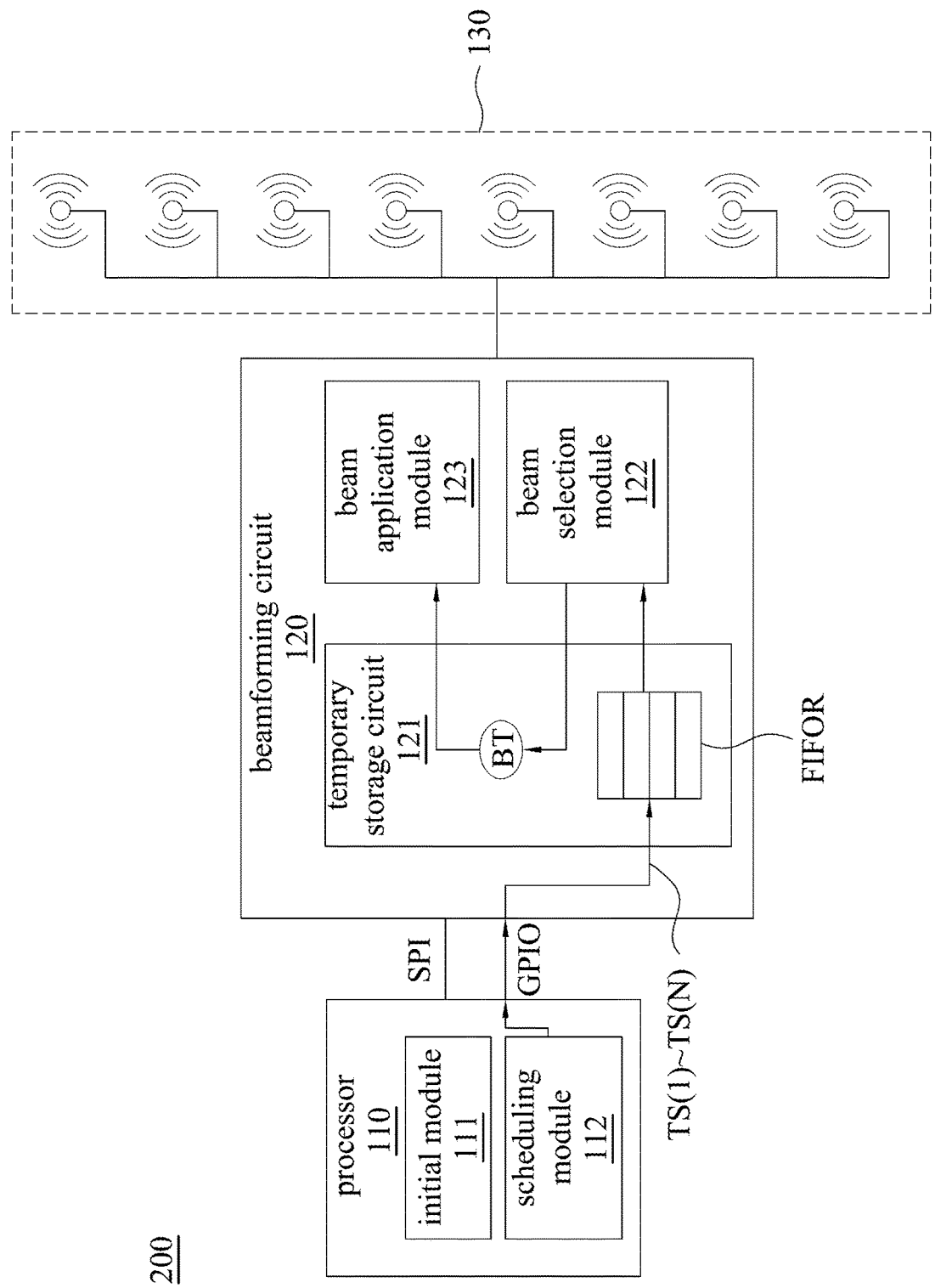
FIG. 2B is a schematic diagram of the antenna device in a beamforming stage according to some embodiments of the present disclosure.

Reference is made to FIG. 2A and FIG. 2B, where FIG. 2A is a schematic diagram of an antenna device 200 in an initial stage according to some embodiments of the present disclosure, where FIG. 2B is a schematic diagram of the antenna device 200 in a beamforming stage according to some embodiments of the present disclosure. As shown in FIGS. 2A and 2B, the antenna device 200 includes a processor 110, a beamforming circuit 120, and an antenna array 130. The processor 110 is connected to the beamforming circuit 120, and the beamforming circuit 120 is connected to the antenna array 130. The beamforming circuit 120 includes a first-in-first-out region FIFOR.

Furthermore, the processor 110 controls, through the serial peripheral interface SPI and the general-purpose input/output interface GPIO, the beamforming circuit 120 to make the antenna array 130 perform beamforming, where the serial peripheral interface SPI includes multiple serial peripheral interface transmission pins, and the general-purpose input/output interface GPIO includes multiple general-purpose input/output interface pins.

In some embodiments, the processor 110 includes an initial module 111, where, as shown in FIG. 2A, in the initial stage, the initial module 111 stores, through the serial peripheral interface SPI, the beam table BT in the temporary storage circuit 121, and sets, through the general-purpose input-output interface GPIO, sweep control of the beam corresponding to the beam table BT in the temporary storage circuit 121.

In some embodiments, the beamforming circuit 120 can further include a beam selection module 122 and a beam application module 123. In some embodiments, the processor 110 further includes a scheduling module 112. In some embodiments, as shown in FIG. 2B, in a beamforming stage, the scheduling module 112 can only switch, through the general-purpose input/output interface GPIO, the beam index stored in the first-in-first-out region FIFOR, so as to switch the beam generated by the antenna array 130. In some embodiments, in the beamforming stage, the scheduling module 112 can sequentially transmit, through the general-purpose input/output interface GPIO, the sweep signals TS(1) to TS(N) to the first-in-first-out region FIFOR, where N is any positive integer. In some embodiments, in the beamforming stage, whenever the scheduling module 112 transmits, through the general-purpose input and output interface GPIO, one of the sweep signals TS(1) to TS(N) to the first-in-first-out region FIFOR, the first-in-first-out region FIFOR is in a readable state, so as to make the beam selection module 122 read the beam index in the first-in-first-out region FIFOR by the first-in-first-out method. After the reading is completed, the first-in-first-out region FIFOR can also be switched to an unreadable state based on some safety mechanism considerations.

In detail, when the scheduling module 112 transmits, through the general-purpose input/output interface GPIO, the first sweep signal TS(1) to the first-in-first-out region FIFOR, the first-in-first-out region FIFOR can be switched to a readable state, so as to make the beam selection module 122 read a first stored beam index in the first-in-first-out region FIFOR. By analogy, in response to the sweep signals TS(2) to TS(N) transmitted sequentially, the beam selection module 122 sequentially reads other beam indices in the first-in-first-out region FIFOR by the first-in-first-out method.

In some embodiments, in the beamforming stage, the beam selection module 122 can select the beam parameter of the corresponding candidate beam direction from the beam table BT according to the read beam index, so as to transmit the beam parameter of the candidate beam direction to the beam application module 123. Next, the beam application module 123 controls the antenna array 130 to perform beamforming according to the beam parameter of the corresponding candidate beam direction.

Notably, the above-mentioned initial module 111 and scheduling module 112 can be provided in the processor 110 in the form of a hardware circuit, can also be stored in a register (not shown) in the processor 110 in the form of a software program, and can further be a software program stored in an external storage device (not shown) for the processor 110 to read and execute.

Figure 3:
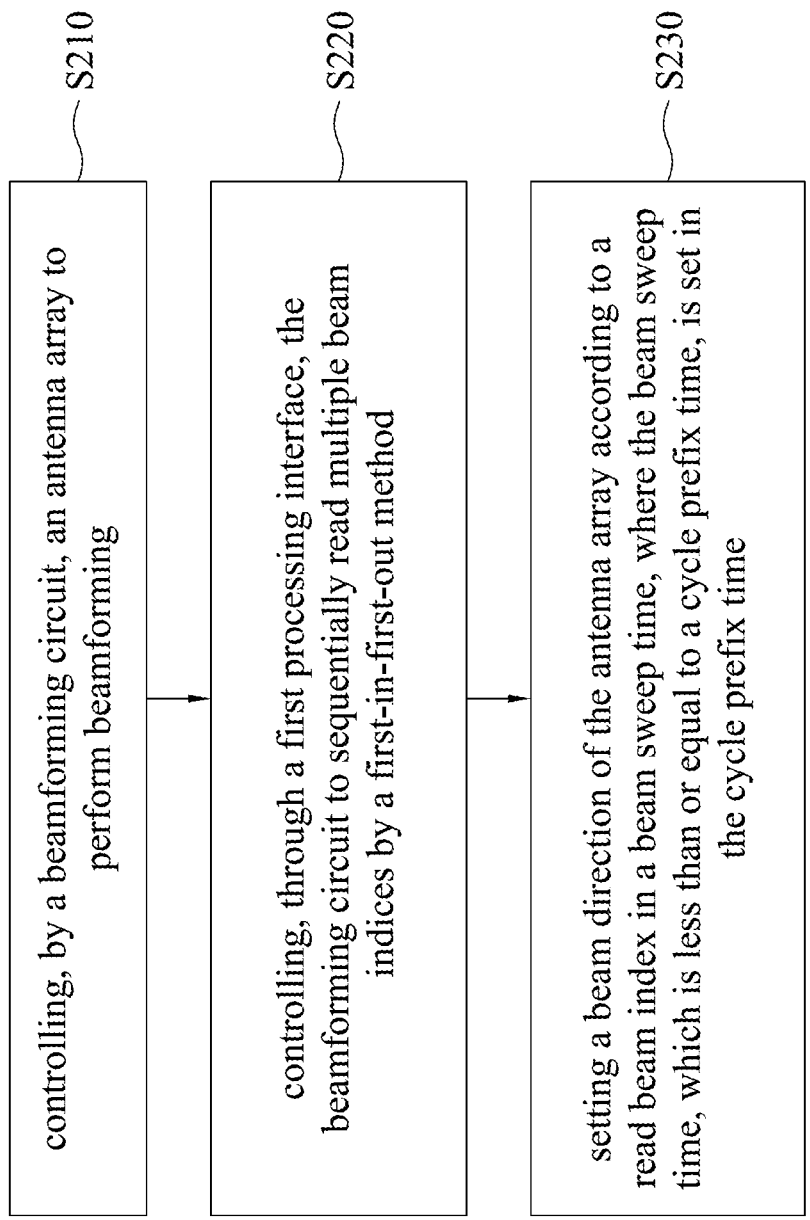
FIG. 3 is a flowchart of the beam control method of the present disclosure.

Reference is made to FIG. 3, which is a flowchart of the beam control method of the present disclosure. The antenna device 100 shown in FIG. 1 can be used for performing all the steps in the beam control method shown in FIG. 3.

Firstly, in step S210, controlling, by the beamforming circuit 120, the antenna array 130 to perform beamforming.

Furthermore, in step S220, controlling, through a first processing interface IF1, the beamforming circuit 120 to sequentially read the multiple beam indices by the first-in-first-out method.

And, in step S230, setting the beam direction of the antenna array 130 according to a read beam index in beam sweep time, where the beam sweep time, which is less than or equal to a cycle prefix (CP) time, is set in the cycle prefix time.

Further, using the antenna device and the beam steering method of the present disclosure, the beam sweep time (i.e., the time required to switch the direction of the beam of the antenna array 130) can be set to be less than or equal to the cyclic prefix time, thereby setting the beam sweep time in the cycle prefix time, where the cyclic prefix time is set between multiple symbols (SMB) in a time slot (SL) in a synchronization signal burst (SSB).

In this way, in the beam sweep time, through the first processing interface IF1, the directions of the multiple beams corresponding to the multiple beam indices can be switched sequentially according to the multiple beam indices, so as to solve the above-mentioned beam switching by setting the beam sweep time in the time slot by the current technical means.

Figure 4:
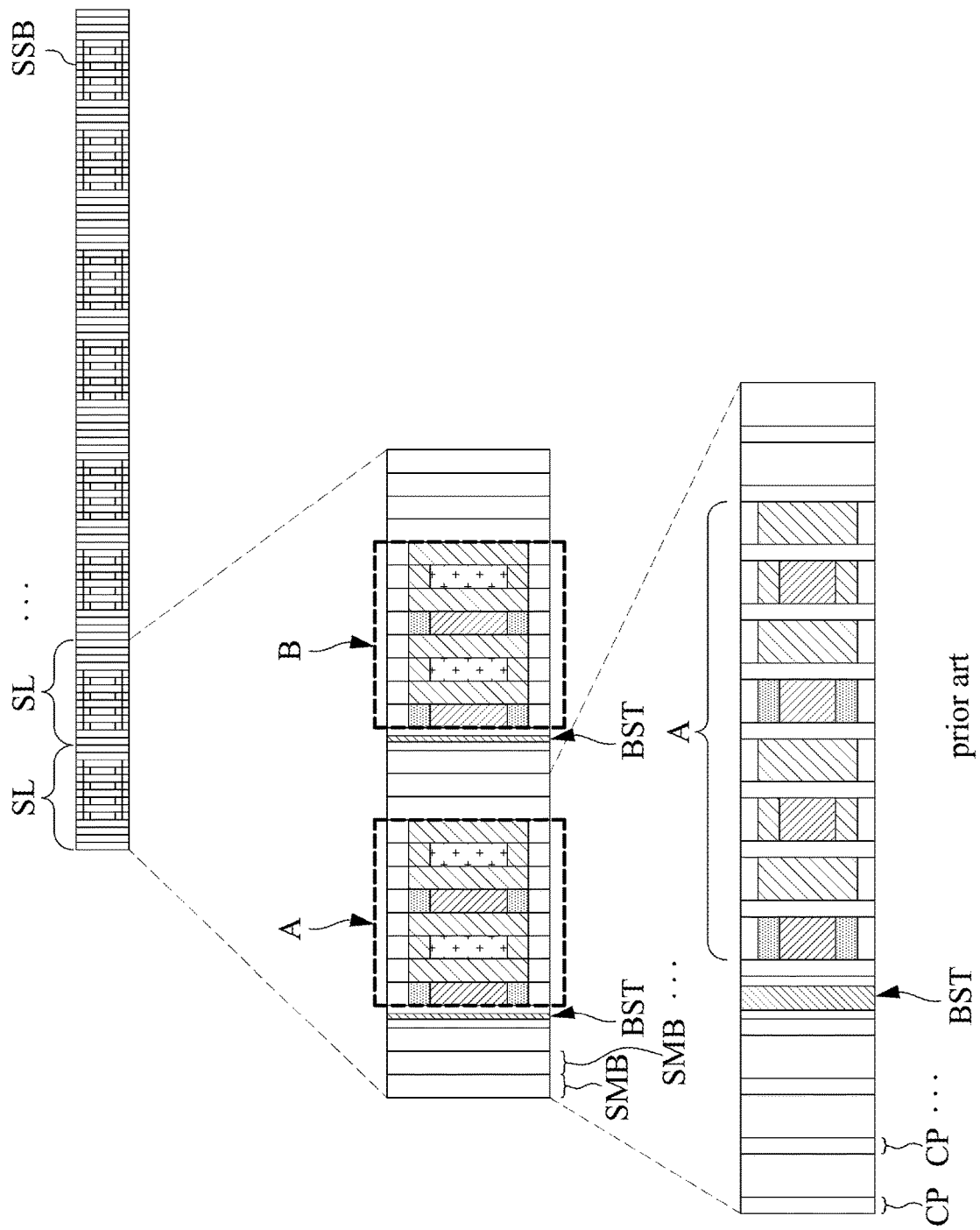
FIG. 4 is a schematic diagram of beam sweep time in prior art.

Prior art and the above-mentioned relationship between the beam sweep time and the cycle prefix time are further described below with an actual example. Reference is made to FIG. 4, which is a schematic diagram of beam sweep time BST in prior art. As shown in FIG. 4, taking two time slots SL of a synchronization signal burst SSB as an example, each time slot SL has 14 symbols SMB. Assuming that the subcarrier spacing (SCS) is 120 kHz, the time slot SL is 125 microseconds, and time of the symbol SMB is 8.93 milliseconds.

In the prior art, since the above-mentioned first-in-first-out region FIFOR does not exist, only the beam index corresponding to a specific beam can be transmitted to the beamforming circuit through the serial peripheral interface, and the sweep signal is transmitted to the beamforming circuit through the general-purpose input/output interface, so as to make the beamforming circuit select the beam parameter of the candidate beam direction corresponding to the beam index from the pre-stored beam table. In this way, the beamforming circuit can control the antenna array to perform beamforming according to the beam parameter.

It can be known that, the switching of the beams consumes time for the serial peripheral interface to transmit the beam index corresponding to the specific beam and time for the general-purpose input/output interface to transmit the sweep signal. Assuming that time of one clock is 0.05 microseconds, time for the serial peripheral interface transmitting the beam index corresponding to the specific beam needs 72 clocks, and time for the general-purpose input/output interface transmitting the sweep signal needs 3 clocks, at this time, the beam sweep time BST is 3.75 microseconds.

Further, assuming that the cyclic prefix time CP is 0.57 microseconds, since a longer beam sweep time BST is required at this time, such a beam sweep time BST cannot be inserted into the cyclic prefix time CP, the beamforming circuit 120 can only switch to a beam A during time of a 4th symbol (i.e., the beam sweep time BST is inserted in the time of the 4th symbol), so as to transmit or receive data using the beam A in 5th to 12th symbols SMB, and switch to a beam B in time of a 16th symbol (i.e., the beam sweep time BST is inserted in the time of the 16th symbol), so as to transmit or receive data using the beam B in 17th to 24th symbols SMB. In other words, in the prior art, the beamforming circuit 120 can only insert the beam sweep time BST in the symbol SMB when the beam needs to be switched. This results in that only 2 beams can be switched sequentially in the 2 time slots SL.

Figure 5:
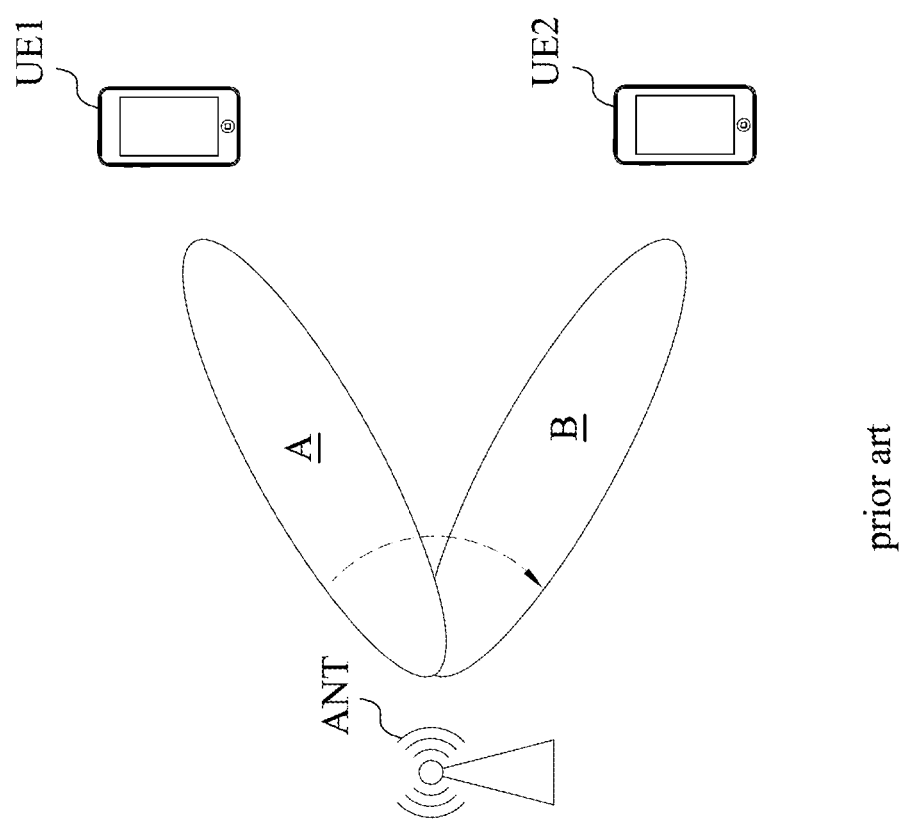
FIG. 5 is a schematic diagram of switching a beam direction in the prior art.

Reference is made to FIG. 5, which is a schematic diagram of switching a beam direction in the prior art. As shown in FIG. 5, by the method of inserting the beam sweep time BST in the symbol SMB in FIG. 4, antenna device ANT in the prior art can only generate the beams A to B sequentially in two time slots SL to communicate with user devices UE1 to UE2 respectively.

Figure 6:
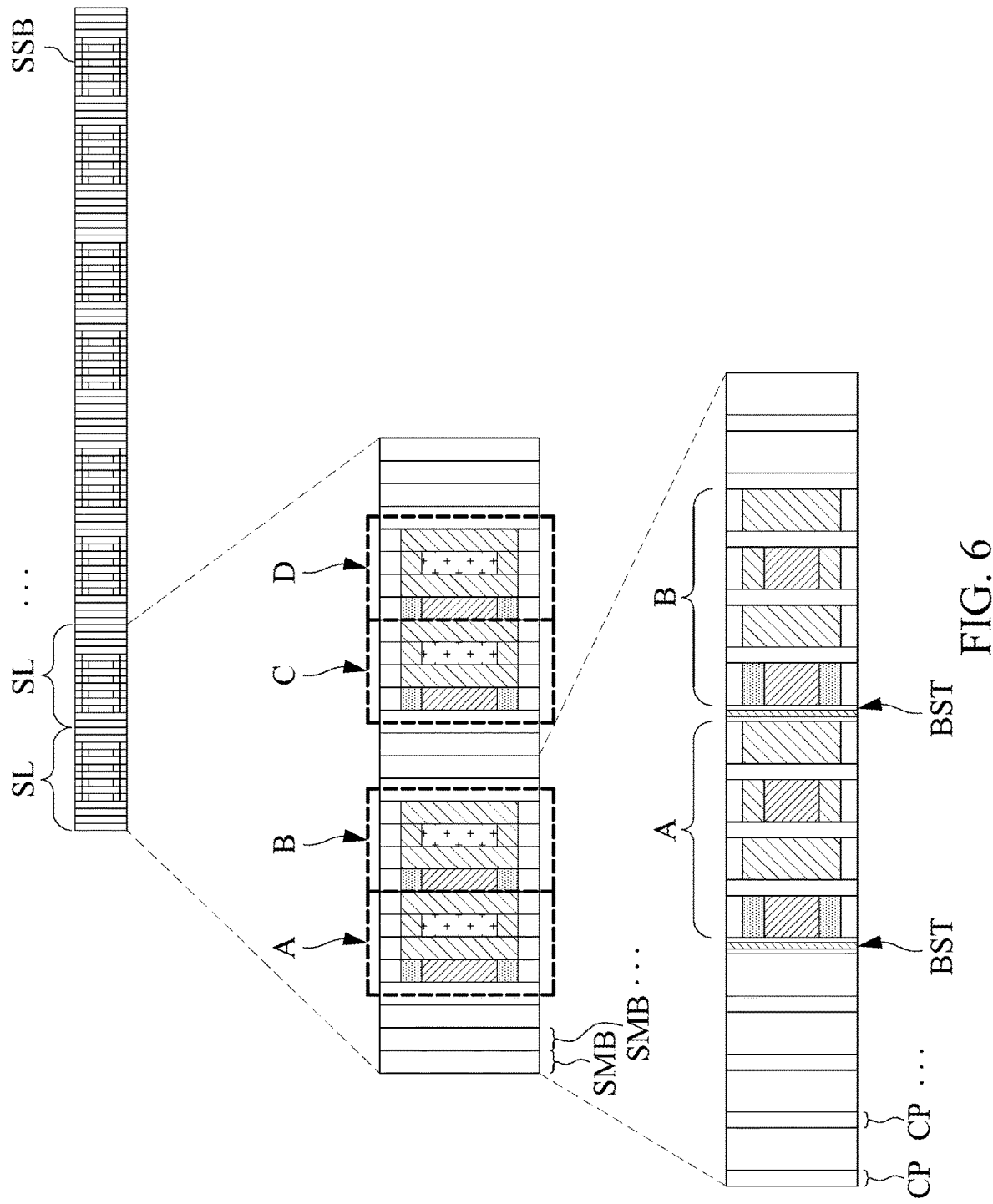
FIG. 6 is a schematic diagram of the beam sweep time according to some embodiments of the present disclosure.

Reference is made to FIG. 6, which is a schematic diagram of the beam sweep time BST according to some embodiments of the present disclosure. As shown in FIG. 6, taking two time slots SL of a synchronization signal burst SSB as an example, each time slot SL has 14 symbols SMB. Assuming that the subcarrier spacing is 120 kHz, the time slot SL is 125 microseconds, and the symbol SMB time is 8.93 milliseconds.

In this embodiment, the processor 110 transmits, through the general-purpose input/output interface GPIO, the sweep signal to the first-in-first-out region FIFOR, thereby making the beam selection module 122 read the first stored beam index in the first-in-first-out region FIFOR, so as to make the beam selection module 122 select the beam parameter of the candidate beam direction corresponding to the beam index from the beam table BT. By analogy, in response to the sweep signal transmitted later, the beam selection module 122 sequentially reads other beam indices in the first-in-first-out region FIFOR by the first-in-first-out method.

In this way, the beam selection module 122 can select the beam parameter of the candidate beam direction corresponding to the read beam index from the beam table BT, and transmit the beam parameter to the beam application module 123 for controlling the antenna array 130 to perform beamforming according to the beam parameter.

It can be known that, the switching of the beam only consumes time for the general-purpose input/output interface GPIO transmitting the sweep signal. Assuming that time of one clock is 0.05 microseconds, and the time for the general-purpose input/output interface GPIO transmitting the sweep signal needs 3 clocks, at this time, the beam sweep time BST is 0.15 microseconds.

Further, assuming that the cycle prefix time CP is 0.57 microseconds, since only a shorter beam sweep time BST (i.e., 0.15 seconds) is required at this time, the beamforming circuit 120 can switch to beam A in 5th cyclic prefix time CP to transmit or receive data using the beam A in 5th to 8th symbols SMB, and switch to beam B in 9th cyclic prefix time CP to transmit or receive data using the beam B in 9th to 12th symbols SMB. By analogy, the same method can be used for switching from the beam B to beam C, and finally switch from the beam C to beam D.

In other words, with the above-mentioned method, the beamforming circuit 120 can insert the beam sweep time BST into the cyclic prefix time CP when the beam needs to be switched. In this way, also in the two time slots SL, the antenna device 100 of the present disclosure can switch from the beam A to the beam D sequentially. In contrast, in the prior art shown in FIG. 4 above, only two beams can be switched sequentially in two time slots SL.

Figure 7:
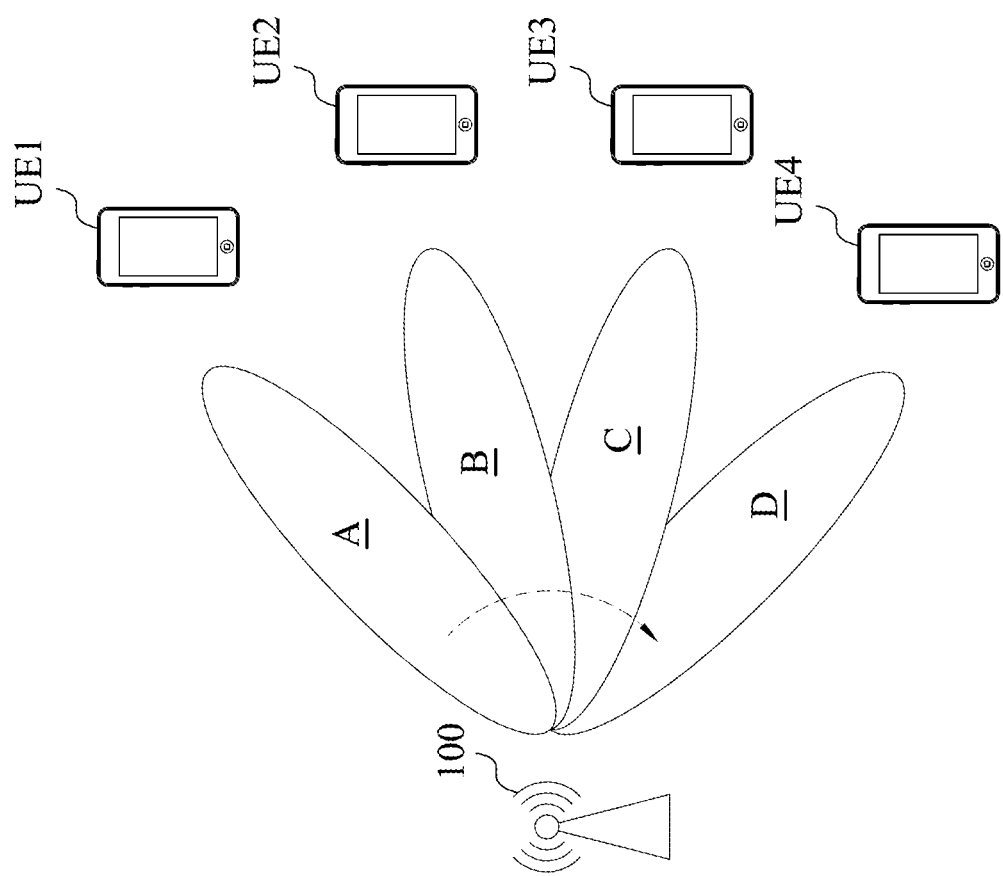
FIG. 7 is a schematic diagram of the antenna device switching a beam direction according to some embodiments of the present disclosure.

Reference is made to FIG. 7, which is a schematic diagram of an antenna device 100 switching the beam direction according to some embodiments of the present disclosure. As shown in FIG. 7, with the method of inserting the beam sweep time BST in the cyclic prefix time CP in FIG. 6, the antenna device 100 can generate the beams A to D sequentially to communicate with user devices UE1 to UE4 respectively. Whenever a new beam is generated, only time for 3 general-purpose input/output clocks is required, which will greatly reduce the time required to set the direction of the beam of the antenna array 130.

Summary, the present disclosure can set the first-in-first-out region in the temporary storage circuit in the beamforming circuit to pre-store all beam indices of the directions of the beams to be generated by the antenna array. In this way, the beams of the antenna array can be quickly switched only by using the general-purpose input/output interface. Furthermore, the beams of the antenna array can be switched in the beam sweep time in the cyclic prefix time to greatly reduce the time required to set the direction of the beams of the antenna array.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An antenna device, comprising:
   an antenna array;
   a beamforming circuit, connected to the antenna array, wherein the beamforming circuit is configured for controlling the antenna array to perform beamforming, wherein the beamforming circuit comprises a temporary storage circuit, wherein the temporary storage circuit comprises a first-in-first-out region, and the first-in-first-out region stores a plurality of beam indices; and
   a processor, connected to the beamforming circuit, wherein the processor is configured for controlling the beamforming circuit through a first processing interface to sequentially read the plurality of beam indices by a first-in-first-out method, and setting a beam direction of the antenna array according to a read beam index, wherein the read beam index corresponds to the beam direction of the antenna array,
   wherein the processor is further configured for setting a beam direction of the antenna array according to a read beam index in beam sweep time, wherein the beam sweep time, which is less than or equal to a cycle prefix time, is set in the cycle prefix time,
   wherein the first processing interface is a general-purpose input/output interface.

2. The antenna device of claim 1, wherein the temporary storage circuit stores a beam table, and the beam table comprises beam parameters of a plurality of candidate beam directions.

3. The antenna device of claim 2, wherein the processor is further configured for:
controlling, through the first processing interface, the beamforming circuit to select a beam parameter of a corresponding candidate beam direction from the beam table according to the read beam index; and
setting the beam direction of the antenna array according to the beam parameter of the corresponding candidate beam direction.

4. The antenna device of claim 3, wherein the beam parameter of the corresponding candidate beam direction comprises a respective phase control bit string and a respective amplitude control bit string of a plurality of antenna elements in the antenna array.

5. The antenna device of claim 4, wherein the respective phase control bit string of the plurality of antenna elements is configured for controlling a respective phase of the plurality of antenna elements to adjust the beam direction of the antenna array.

6. The antenna device of claim 4, wherein the respective amplitude control bit string of the plurality of antenna elements is configured for controlling respective amplitude of the plurality of antenna elements to adjust a beam width of the antenna array.

7. The antenna device of claim 2, wherein the processor is further configured for:
in an initial stage, storing the beam table in the temporary storage circuit through a second processing interface.

8. The antenna device of claim 7, wherein the second processing interface is a serial peripheral interface.

9. The antenna device of claim 8, wherein the beamforming circuit comprises a beam selection module and a beam application module, wherein the processor is further configured for:
controlling, through the general-purpose input/output interface, the beam selection module to read the plurality of beam indices in the first-in-first-out region by the first-in-first-out method, so as to transmit the read beam index to the beam application module; and
controlling, by the beam application module, the antenna array to perform beamforming according to the read beam index.

10. The antenna device of claim 1, wherein the temporary storage circuit is a temporary register.

11. A beam control method, comprising:
controlling, by a beamforming circuit, an antenna array to perform beamforming, wherein the beamforming circuit comprises a temporary storage circuit, wherein the temporary storage circuit comprises a first-in-first-out region, and the first-in-first-out region stores a plurality of beam indices;
controlling, through a first processing interface, the beamforming circuit to sequentially read the plurality of beam indices by a first-in-first-out method; and
setting a beam direction of the antenna array according to a read beam index in beam sweep time, wherein the beam sweep time, which is less than or equal to a cycle prefix time, is set in the cycle prefix time,
wherein the first processing interface is a general-purpose input/output interface.

12. The beam control method of claim 11, wherein the temporary storage circuit stores a beam table, and the beam table comprises beam parameters of a plurality of candidate beam directions.

13. The beam control method of claim 12, further comprising:
controlling, through the first processing interface, the beamforming circuit to select a beam parameter of a corresponding candidate beam direction from the beam table according to the read beam index; and
setting the beam direction of the antenna array according to the beam parameter of the corresponding candidate beam direction.

14. The beam control method of claim 13, wherein the beam parameter of the corresponding candidate beam direction include a respective phase control bit string and a respective amplitude control bit of a plurality of antenna elements in the antenna array.

15. The beam control method of claim 14, wherein the respective phase control bit string of the plurality of antenna elements is configured for controlling a respective phase of the plurality of antenna elements to adjust the beam direction of the antenna array.

16. The beam control method of claim 14, wherein the respective amplitude control bit string of the plurality of antenna elements is configured for controlling respective amplitude of the plurality of antenna elements to adjust a beam width of the antenna array.

17. The beam control method of claim 12, further comprising:
in an initial stage, storing the beam table in the temporary storage circuit through a second processing interface.

18. The beam control method of claim 17, wherein the second processing interface is a serial peripheral interface.

19. The beam control method of claim 18, wherein the beamforming circuit comprises a beam selection module and a beam application module, wherein the beam control method further comprises:
controlling, through the general-purpose input/output interface, the beam selection module to read the plurality of beam indices in the first-in-first-out region by the first-in-first-out method, so as to transmit the read beam index to the beam application module; and
controlling, by the beam application module, the antenna array to perform beamforming according to the read beam index.

20. The beam control method of claim 11, wherein the temporary storage circuit is a temporary register.

* * * * *